US012776113B2

(12) United States Patent
Barley

(10) Patent No.: US 12,776,113 B2
(45) Date of Patent: Oct. 27, 2026

(54) COMPUTER AIDED AUTOMATED SHAPE ADJUSTMENT OF THREE-DIMENSIONAL GEOMETRIES

(71) Applicant: Autodesk, Inc., San Francisco, CA (US)

(72) Inventor: Stephen Alan Barley, Cambridge (GB)

(73) Assignee: Autodesk, Inc., San Francisco, CA (US)

( * ) Notice: Subject to any disclaimer, the term of this patent is extended or adjusted under 35 U.S.C. 154(b) by 480 days.

(21) Appl. No.: 18/365,471

(22) Filed: Aug. 4, 2023

(65) Prior Publication Data

US 2025/0046037 A1 Feb. 6, 2025

(51) Int. Cl.

| | |
|---|---|
| ***G06T 19/20*** | (2011.01) |
| ***G05B 19/4099*** | (2006.01) |
| ***G06T 17/20*** | (2006.01) |

(52) U.S. Cl.

CPC .......... *G06T 19/20* (2013.01); *G05B 19/4099* (2013.01); *G06T 17/20* (2013.01); *G05B 2219/35134* (2013.01); *G06T 2200/24* (2013.01); *G06T 2219/2021* (2013.01)

(58) Field of Classification Search

None

See application file for complete search history.

(56) References Cited

U.S. PATENT DOCUMENTS 10,467,807 B1 * 11/2019 Strater .................. B33Y 50/00
2022/0126518 A1 * 4/2022 Arnon .................. B29C 64/295

OTHER PUBLICATIONS

Krishnamurthy et al. (Fitting Smooth Surfaces to Dense Polygon Meshes, SIGGRAPH, 1996) (Year: 1996).*
Bærentzen et al., "Guide to Computational Geometry Processing: Foundations, Algorithms, and Methods," 2012, Chapter 17, p. 296.
Nurunnabi et al., "Robust Cylinder Fitting in Laser Scanning Point Cloud Data," Measurement, May 2019, 138:632-651.
Taubin, "Curve and Surface Smoothing Without Shrinkage," Proceedings of IEEE International Conference on Computer Vision, Jun. 1995, pp. 852-857.

* cited by examiner

*Primary Examiner* — Kyle Zhai
(74) *Attorney, Agent, or Firm* — Fish & Richardson P.C.

(57) ABSTRACT

Methods, systems, and apparatus, including medium-encoded computer program products, for computer aided design, including obtaining, by a shape modeling computer program, a selection of first geometry defined in a data structure used by the shape modeling computer program to represent a three-dimensional model of an object and an indication of an amount of desired prismatification, wherein the first geometry is defined in the data structure using a control mesh for a smooth surface representation of the first geometry. The shape modeling computer program produces second geometry defined in the data structure based on the indication of the amount of desired prismatification, wherein the second geometry replaces the first geometry in representing the three-dimensional model of the object. The shape modeling computer program provides the three-dimensional model of the object, with the second geometry included in the three-dimensional model.

16 Claims, 13 Drawing Sheets

COMPUTER AIDED AUTOMATED SHAPE ADJUSTMENT OF THREE-DIMENSIONAL GEOMETRIES

BACKGROUND

This specification relates to computer aided design of physical structures, which can be manufactured using additive manufacturing, subtractive manufacturing and/or other manufacturing systems and techniques, or other structures, and which can be provided as a digital asset, such as for use in animation.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modeled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold) and molding.

SUMMARY

This specification describes technologies relating to computer aided design of structures by shape synthesis, e.g., automated design of physical structures. The systems and techniques described can be used with computer aided design of three-dimensional (3D) geometry when an initially synthesized shape has too high of a ratio of organic to prismatic features for a desired application, such as for downstream operations to be performed on the generated geometry, e.g., to prepare for manufacturing of the structure, and at least some of that shape will be smoothed before further use of the 3D geometry. Also, the systems and techniques described are applicable in other technical fields of endeavor, including generation of conceptual work or digital-only assets, such as for use in animation. In general, the described systems and techniques for smoothing of an automatically generated 3D geometry can facilitate further use of the 3D geometry by maintaining shape continuity, e.g., maintaining, C0, C1 and C2 continuity while making the 3D geometry more readily editable by the user. Further, selectively smoothing 3D geometry (as described in this application) can avoid over-smoothing of regions of high curvature and create a gradual transition to adjoining unsmoothed regions of the 3D geometry.

In general, one or more aspects of the subject matter described in this specification can be embodied in one or more methods (and also one or more non-transitory computer-readable mediums tangibly encoding a computer program operable to cause data processing apparatus to perform operations), including: obtaining, by a shape modeling computer program, a selection of first geometry defined in a data structure used by the shape modeling computer program to represent a three-dimensional model of an object and an indication of an amount of desired prismatification, wherein the first geometry is defined in the data structure using a control mesh for a smooth surface representation of the first geometry. The shape modeling computer program produces second geometry defined in the data structure based on the indication of the amount of desired prismatification, wherein the second geometry replaces the first geometry in representing the three-dimensional model of the object. The shape modeling computer program provides the three-dimensional model of the object, with the second geometry included in the three-dimensional model, for use in manufacturing a physical structure corresponding to the object using one or more computer-controlled manufacturing systems, or for use in displaying the object on a display screen.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In some implementations, the control mesh includes edges connected by vertices, and producing the second geometry includes, for at least a first set of the edges connected by the vertices including first edges and first vertices, calculating a distance tolerance for the first edges and the first vertices based on the indication of the amount of desired prismatification. The producing includes fitting, for each vertex in the first vertices, a circle to the vertex and its two nearest neighbor vertices in the first set, the circle having a local center point and radius, and adjusting, for at least one subset of the first vertices that have at least their local center points within the distance tolerance of each other, a position of each vertex in the at least one subset to have a common radius distance to a common center point to turn the first geometry into the second geometry.

In some implementations, the producing of the second geometry includes determining a cylinder that minimizes offset distances between the cylinder and the first vertices in the first set, and determining a largest subset of the first vertices that have at least their local center points within the distance tolerance of each other, the largest subset being the at least one subset. Adjusting can be performed on only the largest subset of the first vertices, and the common radius distance and the common center point are those of the cylinder.

In some implementations, determining the cylinder that minimizes the offset distances between the cylinder and the first vertices in the first set includes calculating principal component axes using the first vertices of the first set, determining an orientation of an axis on which the cylinder lies based on the principal component axes, and adjusting a value of the common radius distance of the cylinder and the common center point of the cylinder to minimize the offset distances between a curved radial surface of the cylinder and the first set.

In some implementations, determining the largest subset of the first vertices that have at least their local center points within the distance tolerance of each other further includes determining the largest subset of the first vertices that have at least their local radii within the distance tolerance of each other.

In some implementations, the control mesh includes a T-spline surface representation, where the first set of the edges connected by the first vertices form a continuous closed edge loop. For a second set of the edges connected by the vertices including second edges and second vertices, where the second set of the second edges connected by the second vertices form an open edge loop, producing the second geometry can further include calculating a second distance tolerance for the second edges and the second vertices based on the indication of the amount of desired prismatification, fitting, for each vertex in the second vertices, a circle to the vertex and its two nearest neighbor vertices in the second set, the circle having a local center point and radius, and adjusting, for at least one subset of the second vertices that have at least their local center points within the second distance tolerance of each other, a position of each vertex in the at least one subset to have a common radius distance to a common center point to turn the first geometry into the second geometry.

In some implementations, obtaining the first geometry includes obtaining an indication of one or two directions as defined by an unwrapped, two-dimensional version of the first geometry. The at least the first set of the edges can be connected along a first direction specified by the indication of one or two directions in the unwrapped, two-dimensional version of the first geometry. Producing the second geometry can further include, for a second set of the edges connected along the first direction of the one or two directions in the unwrapped, two-dimensional version of the first geometry, fitting, for each vertex in the vertices of the second set of edges, a respective circle to the vertex and its two nearest neighbor vertices in the second set of edges, the circle having a local center point and radius, and adjusting, for at least one subset of the vertices of the second set of edges that have at least their local center points within the distance tolerance of each other, a position of each vertex in the at least one subset to have a common radius distance to a common center point to turn the first geometry into the second geometry.

In some implementations, producing the second geometry includes adjusting vertices of each set of edges of the first set of edges and the second set of edges of the first geometry independently from each other, and along a second direction perpendicular to the indicated first direction in the unwrapped, two-dimensional version of the first geometry.

In some implementations, the control mesh includes a T-Spline control mesh generated from a polygon mesh output from an automatic 3D geometry generation algorithm.

In some implementations, the methods further include presenting, through a user interface, a representation of the three-dimensional model of the object and one or more candidate regions of the three-dimensional model on which to apply a prismatification operation, and receiving, through the user interface, the selection of the first geometry of the three-dimensional model of the object on which to apply the prismatification operation to produce the second geometry.

In some implementations, prismatification includes (A) a smoothing operation applied to the first geometry and (B) a ratio of organic features versus prismatic features between the first geometry and the second geometry.

In some implementations, the methods further include presenting, in a user interface, dynamic controls for adjusting an amount of prismatification of the first geometry to form the second geometry. The methods can further include receiving, through the user interface, an indication of an update to the amount of prismatification. The methods can further include producing, an updated second geometry defined in the data structure based on the indication of the update to the amount of prismatification, wherein the updated second geometry replaces the second geometry in representing the three-dimensional model of the object, and presenting, in the user interface, the updated second geometry.

In some implementations, producing the updated second geometry defined in the data structure based on the indication of the update to the prismatification, includes calculating an updated distance tolerance for the edges and the vertices based on the indication of the updated amount of prismatification.

Particular embodiments of the subject matter described in this specification can be implemented to realize one or more of the following advantages. The automated shape adjustment system can generate a control mesh of a smooth surface representation of an object from an input mesh that captures an original topology of the input mesh but with simplified geometry. The modifications can be applied directly to a control mesh, e.g., direct T-spline modification. A prismatification (e.g., smoothing and moving away from organic features toward prismatic features) of the 3D geometry defined by the generated output control mesh from the automated shape adjustment system is updated as compared to an output mesh of a smooth surface representation of the object generated from a direct conversion of the input mesh. The variation in curvature of the control mesh is representative of the amount of prismatification that is applied, where a degree of prismatification is controlled by the user-specified distance tolerance. For example, if the distance tolerance is large, then the local curvature variation will be significantly reduced in the regions where the smoothing is applied since the control mesh defining those regions becomes more prismatic. Conversely, for a small distance tolerance there will be less prismatification than for a large distance tolerance case and only a limited reduction in the curvature variation occurs since fewer regions of the control mesh will be affected (i.e., and to a lesser extent). The resulting smoothed output model can be significantly more editable in downstream operations, e.g., adding blends between organic regions and preserves in simulation, and can have improved ease of manufacture and reduced cost of manufacturing.

The methods described here can reduce/remove 'kinks' in the 3D model without fundamentally changing the underlying shape (e.g., preserving the underlying physics advantages from a generatively designed model). In other words, the methods result in a graduated smoothing of the first geometry to generate the second geometry, which can result in more aesthetic, 'cad-like' generative design results.

Each set of vertices of the control mesh (e.g., each sequence of edges) defining first geometry can be considered independently (and sequentially) of each other set of vertices defining the first geometry, where adjustments are determined by the set of vertices and the adjustments of the first geometry are made independently of each other set of vertices. This can result more gradual transitions between unsmoothed regions adjoining regions that are smoothed.

The system can provide feedback to a user (e.g., visual feedback) in real-time highlighting the smoothing changes that have been made to the model based on the user input of an amount of prismatification, e.g., color-coded regions of degrees of change. An extent of modification can be controlled by the user, for example, a user can restrict to radial or linear modification (e.g., in order to preserve particular features of the original model). A user can indicate a direction defined along a two-dimensional, unwrapped representation of the first geometry to indicate a radial or linear modification (or both).

In some instances, a topology optimization process can be used to perform automatic generation of 3D geometry of an object in a design of a physical structure (e.g., "generative design"). In some cases, the topology optimization process takes place using a different representation of geometry than that employed by the CAD system. For example, a CAD system might use a smooth boundary representation ("B-Rep") while the geometry generation and optimization engine might employ a discrete boundary-based representation (e.g., a level set-based representation) or a discrete density-based representation embedded in a voxel or tetrahedral mesh. In such cases, the automated shape adjustment system described herein can be used to first represent a discrete boundary-based or density-based representation as a control mesh of a smooth surface representation that can then be modified to produce a smoothed control mesh of the smooth surface representation of the object.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
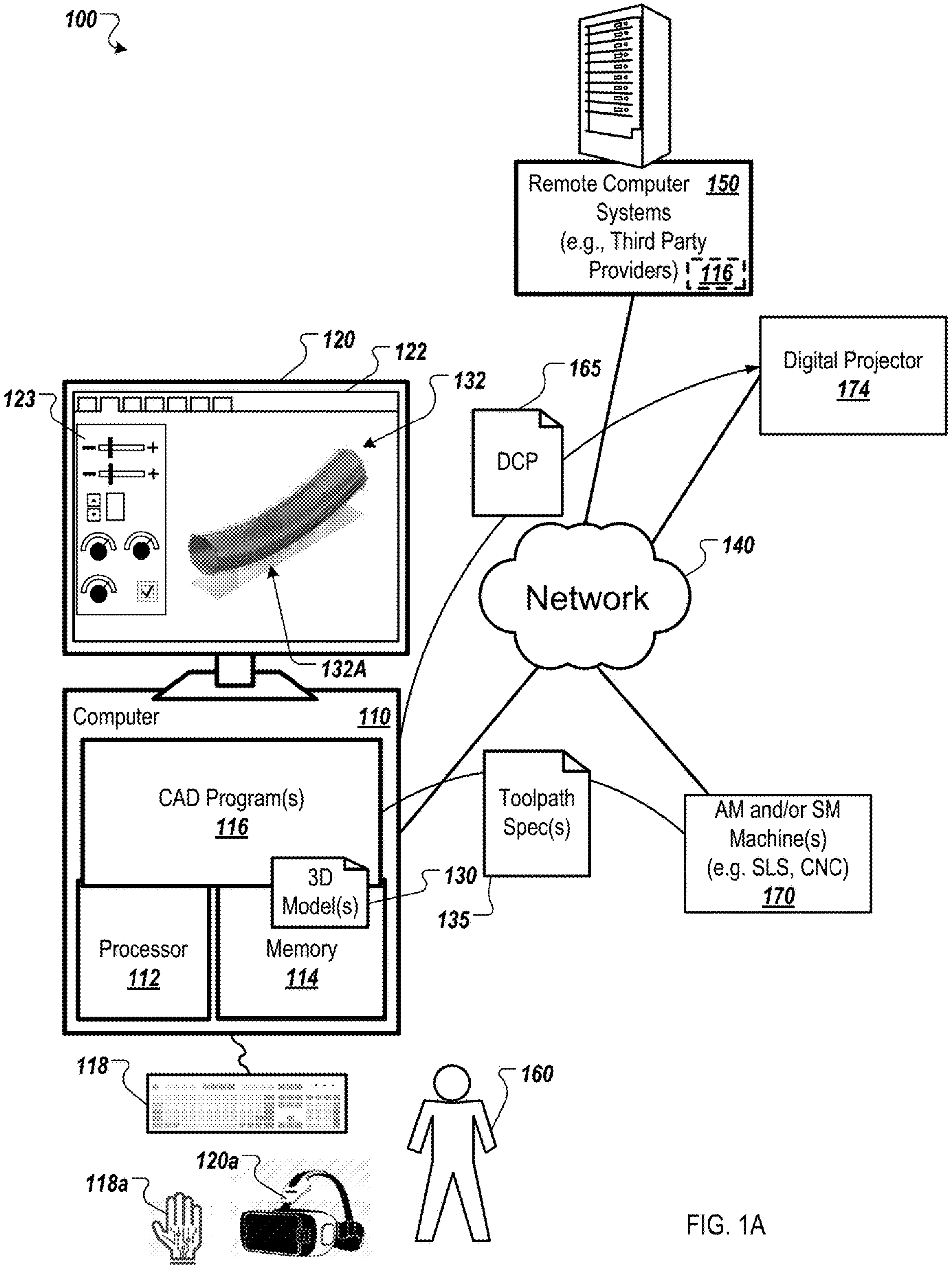
FIG. 1A shows an example of a system usable to facilitate computer aided design of structures with user control of shape prismatification.

FIG. 1A shows an example of a system 100 usable to facilitate computer aided design of structures using automated shape adjustment processes. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions, which can be implemented as part of one or more automated shape generation processes, e.g., shape synthesis and/or generative design processes, or as a post-processing operation performed on a shape that has been automatically generated, e.g., an automated shape adjustment process, or as a user tool for adjusting a level of prismatification or a smoothness of 3D geometries generally.

In some instances, numerical simulation can be used to simulate one or more physical properties and can use one or more types of simulation to produce a numerical assessment of physical response (e.g., structural response) of the modeled object. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electromagnetic flux, and/or material solidification (which is useful for phase changes in molding processes) simulations. Output of numerical simulation processes can be provided as input to the systems and processes described herein.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., shape generation, physical simulation operations, and/or shape reconstruction) "to the cloud" by having one or more programs 116 on one or more computers 150 perform the offloaded processing operations. In some implementations, all automated shape adjustment operations are run by one or more programs in the cloud and not in a shape representation modeler (e.g., B-Rep modeler) that runs on the local computer. Moreover, in some implementations, the shape reconstruction program(s) can be run in the cloud from an Application Program Interface (API) that is called by a program, without user input through a graphical user interface.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, and 120 can include VR/AR input controllers, gloves, or other hand manipulating tools 118*a*, and/or a VR/AR headset 120*a*. In some instances, the input/output devices can include hand-tracking devices that are based on sensors that track movement and recreate interaction as if performed with a physical input device. In some implementations, VR and/or AR devices can be standalone devices that may not need to be connected to the computer 110. The VR and/or AR devices can be standalone devices that have processing capabilities and/or an integrated computer such as the computer 110, for example, with input/output hardware components such as controllers, sensors, detectors, etc.

In any case, a user 160 interacts with the CAD program(s) 116 to create and modify 3D model(s), which can be stored in model document(s) 130. In the example shown in FIG. 1A, a 3D model 132 includes geometry 132A that has been automatically reconstructed using a process that employs systems and techniques described in this document.

The automated shape adjustment process can receive an initial 3D model as input, i.e., the starting shape. The 3D model of the object can be user-generated and/or automatically generated using shape synthesis and/or generative design systems and techniques.

In some implementations, the initial 3D model is represented in a control mesh of a smooth surface representation of the 3D model of the object. In addition to the initial 3D model represented in a control mesh, a desired level of prismatification (e.g., smoothness) can be indicated (e.g., input by a user or automatically generated by the computer program) and can be used to generate a smoothed model from the initial 3D model.

In some implementations, the user 160 provides a 3D model generated using a generative design process, where the 3D model is represented, for example, as a polygon mesh. The generatively designed 3D shape of a modeled object can have a level-set representation used during generative modelling of the object. The generatively designed 3D shape of the object can be varied using topology optimization to update the level-set representation in accordance with shape change velocities based on numerical simulation evaluation. A level-set representation method can be used to track the boundary of the shape of the modeled object during topology optimization, which has the advantages of providing precise knowledge of the boundary, and allowing topological changes as the surface evolves without the need for re-meshing. The shape synthesis and/or generative design processes can implement connectivity filtering to keep preserve bodies connected. In any case, note that the shape synthesis process can (and often will) be done using a different representation of geometry than that employed by the CAD program(s) 116 for 3D modeling. In such cases, the polygon mesh is converted to a control mesh of a smooth surface representation of the 3D model (e.g., a T-Spline, B-Spline, or quad mesh control frame representation of the 3D model) prior to applying the prismatification process described herein. For example, if the starting shape is a polygon mesh output from an automated shape generation system, e.g., generative design (GD) solver, or a polygon mesh generated from a smooth surface representation of a 3D model of an object, a control mesh of a smooth surface representation is generated as an input to the prismatification process.

At times, an output first geometry of the automated shape generation process may include features, e.g., a shape curvature, feature density, or organic features, etc., that exceeds a desired smoothness or ratio of prismatic versus organic features, e.g., is unreasonable, expensive, and/or difficult to manipulate, manufacture, etc., such that a user may desire to use the automated shape adjustment to generate a smoothed second geometry from the first geometry.

In any case, an input to the shape modeling computer program includes the control mesh of a smooth surface representation of the initial 3D model and/or user selected portions thereof and a desired level of prismatification or smoothness (e.g., input by a user or automatically selected), and the control mesh can be processed by the CAD program (s) 116 using the systems and techniques described in this specification to smooth the 3D geometry, e.g., to produce geometry 132A, while maintaining the basic character of the initial 3D model. Once the user 160 is satisfied with the smoothed model 132, the computer model 132 can be stored as a model document 130 and/or used to generate another representation of the model (e.g., toolpath specifications for a manufacturing process). This can be done upon request by the user 160, or in light of the user's request for another action, such as sending the computer model 132 to a manufacturing machine, e.g., additive manufacturing (AM) machine(s) and/or subtractive manufacturing (SM) machine(s) 170, or other manufacturing machinery, which can be directly connected to the computer 110, or connected via a network 140, as shown. This can involve a post-process carried out on the local computer 110 or externally, for example, based on invoking a cloud service running in the cloud, to further process the generated 3D model (e.g., based on considerations associated with the additive manufacturing process) and to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model for later use. For example, the CAD program(s) 116 can store the document 130 that includes the algorithmically designed model 132.

The CAD program(s) 116 can provide a document 135 (having toolpath specifications of an appropriate format) to an AM and/or SM machine 170 to produce a physical structure corresponding to at least a portion of the algorithmically designed model 132. An AM machine 170 can employ one or more additive manufacturing techniques, such as granular techniques (e.g., Powder Bed Fusion (PBF), Selective Laser Sintering (SLS) and Direct Metal Laser Sintering (DMLS)) or extrusion techniques (e.g., Fused Filament Fabrication (FFF), metals deposition). In some cases, the AM machine 170 builds the physical structure directly, and in some cases, the AM machine 170 builds a mold for use in casting or forging the physical structure.

An SM machine 170 can be a Computer Numerical Control (CNC) milling machine, such as a multi-axis, multi-tool milling machine used in the manufacturing process. For example, the CAD program(s) 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 135 (having toolpath specifications of an appropriate format, e.g., a CNC numerical control (NC) program) to the SM machine 170 for use in manufacturing the physical structure using various cutting tools, etc.

In addition, in some implementation, no physical manufacturing is involved. The systems and techniques described herein are applicable to any suitable 3D modelling software. Thus, in some implementations, the CAD program(s) 116 can be animation production program(s) that render the 3D model 132 to a document 165 of an appropriate format for visual display, such as by a digital projector 174 (e.g., a digital cinema package (DCP) 165 for movie distribution) or other high resolution display device. Other applications are also possible.

Figure 1B:
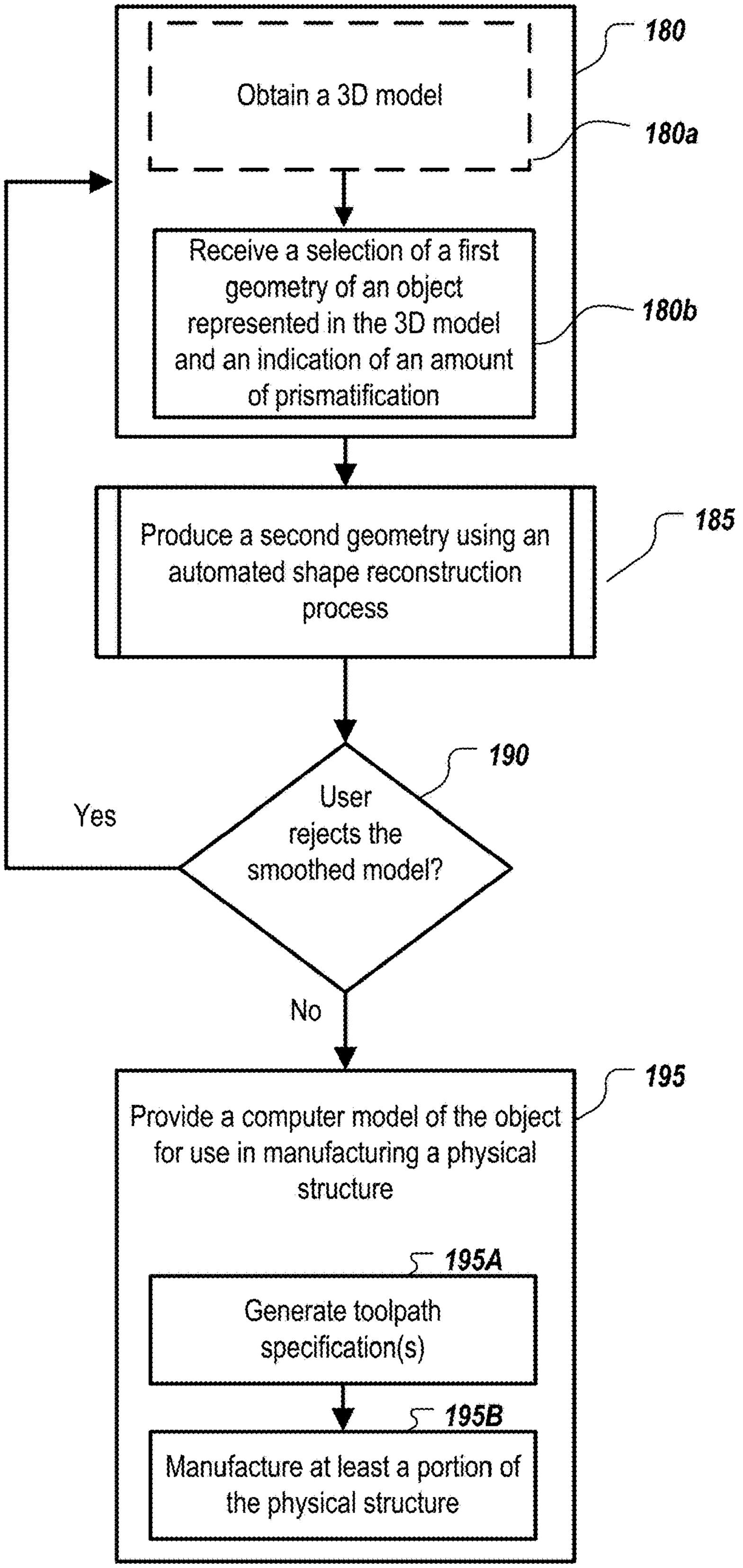
FIG. 1B shows an example of a process of automated shape adjustment.

FIG. 1B shows an example of a process of automated shape adjustment. In general, a shape modeling computer program (e.g., CAD program(s) 116) obtains 180 a selection of a first geometry defined in a data structure used by the shape modeling computer program and an indication of an amount of prismatification (e.g., smoothing and/or ratio of organic to prismatic features), and produces 185 a second geometry defined in the data structure for the first geometry using an automated shape adjustment process based on the amount of indicated prismatification, e.g., as described in further detail with reference to FIGS. 2-4 below. The first geometry can be a control mesh for a smooth surface representation of the first geometry, for example, a T-Spline model, a B-Rep model, or a quad mesh control frame.

In some implementations, the obtaining 180 of the first geometry includes obtaining 180*a* a 3D model by an automated shape generation process, e.g., by a generative design/shape synthesis process, where the 3D model is represented in a polygon mesh. In such cases, the shape modeling computer program converts the received polygon mesh into a control mesh for a smooth surface representation of the first geometry before producing 185 the second geometry.

In some implementations, the obtaining 180 the first geometry includes receiving 180*b* the selection first geometry of the object represented in the 3D model and the indication of the amount of prismatification, where the first geometry is the output of an automated shape adjustment process. Selection of the first geometry can include user selection of portions of the 3D model using user interface tools of the CAD program(s) 116. For example, a user can select regions of the 3D model on which to apply the smoothing of the shape reconstruction process. The selected regions can be less than the entire 3D model.

The second geometry can be a control mesh for a smooth surface representation, for example, a T-Spline surface model, B-Spline surface model, or a quad mesh control frame, where the second geometry replaces the first geometry in representing the three-dimensional model of the object, e.g., replaces the selected region(s) of the 3D model.

In the case of automated shape adjustment (e.g., automated shape remodeling), a selected portion (or all) of a modeled object and the indication of the amount of prismatification are received 180*b*, e.g., by CAD program(s) 116, for use in generating a simplified 3D model. The amount of prismatification can be indicative of one or more shape smoothing objectives. For example, shape smoothing objectives can include, but are not limited to, ease of manufacturability, increasing prismatification (e.g., prismatic versus organic features), reduction in a number or appearance of features less than a threshold size, etc., and are used to drive the automated shape adjustment process towards smoother models.

In some implementations, the receiving 180*b* of the indication of an amount of prismatification can be provided by a user through UI 122 of the shape modeling computer program. The indication of the amount of prismatification can be provided as one or more inputs to the automated shape adjustment process for generating the second geometry from the first geometry. An amount of prismatification can include (A) a threshold smoothness to generate a smoother shape profile and/or a more readily editable smooth surface representation of the object, (B) a transition from organic features to prismatic features (e.g., a ratio or percentage of each), or (C) a combination thereof. A user can input a desired amount of prismatification (e.g., an amount of smoothing) using the UI 122 of the shape modeling computer program using one or more input controls 123 presented in the UI 122. In one example, a prismatification amount can be a value within a range of values, e.g., a value between 1-10. In another example, a user can indicate a prismatification amount by interacting with dynamic control(s) 123 presented as visual indicator(s) (e.g., sliding scale bar, dial/knob, etc.) in the UI of the shape modeling computer program. The shape modeling computer program can receive the desired prismatification and translate the desired prismatification to a usable input format for an automated shape adjustment process.

In some implementations, a user may not provide one or more of the required inputs to inform the generation of the smoothed model. In such cases, the shape modeling computer program can use automated process inputs. For example, the shape modeling computer program can generate one or more process inputs based in part on an appearance of the first geometry, an indicated end-use of the second geometry, or the like. In another example, a user can specify an intended manufacturing method (e.g., 3D printing, 3-axis or 5-axis CNC, etc.) where an amount of prismatification can be increased when simpler tooling is indicated for manufacturing. In another example, a user can specify a desired cost of manufacturing where a smoother model can result in a reduced cost of manufacture.

The indication of prismatification can include geometric objectives for the smoothed model. The geometric objectives can be provided by a user or from the CAD program(s) 116 to ensure certain characteristics of the shape are preserved and/or realized, e.g., to provide a shape that is easier to manufacture, or to preserve particular features of the original model. For example, the geometric objectives can be defined to ensure that the generated smoothed shape can have gradual transitions between adjoining unsmoothed regions. In another example, the geometric objectives can include a ratio of organic versus prismatic features of the second geometry. The geometric objectives can include identified locations on which the automated shape adjustment methods should not be applied (e.g., where smoothing is not desired), or such locations and regions can be excluded from shape reconstruction by not being included in the selection portions of the 3D model to be reconstructed.

In some implementations, 3D model(s) that are produced 185 can be for use in additive manufacturing, subtractive manufacturing (e.g., manufactured using a 2.5-axis subtractive manufacturing process), and/or other manufacturing systems and techniques.

In any case, the production 185 of 3D model(s) can involve modifying, e.g., by CAD program(s) 116, a 3D shape of the modeled object to smooth the 3D shape of the modeled object and/or adjust prismatification of the 3D shape of the modeled object represented in the 3D model(s), as described in further detail with reference to FIGS. 2-4 below.

In some implementations, the output of the automated shape adjustment process is a control mesh of a smooth surface representation of the 3D model of the object. The output can be a boundary representation model (B-rep), T-Spline surface model, B-spline surface model, or quad mesh control frame. In any case, the output 3D model of the object can be fully editable, e.g., using UI tools to interact with the control mesh of the second geometry in the reconstructed 3D model, in the CAD program(s) 116, and such editing can be much easier to do in light of the prismatification of the 3D model. In addition, in some implementations, the 3D model produced by the automated shape adjustment process can be a watertight 3D model.

The result of the automated shape adjustment process can be presented to the user, e.g., in UI 122 on display device 120, along with an option 190 to accept or reject the simplified model. For example, a 3D model produced 185 by the processing can be presented to the user 160 in UI 122. In some implementations, the smoothed model can be presented in UI 122 with a reconstruction report, e.g., documentation related to a prismatification of the second geometry versus the first geometry. For example, a report can include information related to a smoothing of the control mesh of the second geometry. A user can review the smoothed model and reconstruction report and determine whether to update the desired prismatification or to accept the smoothed model.

In some implementations, the user can view the original geometry and the smoothed geometry in the UI 122. The presentation of the original and smoothed geometries can include indicated, e.g., highlighted, outlined, or otherwise distinguished, differences between the original and smoothed geometries.

In some implementations, two or more smoothed 3D models resulting from the production 185 process, e.g., each constructed using a different amount of prismatification, can be presented to the user along with trade-off analysis of prismatification versus cost of manufacturing, e.g., based on the amount of external support structure that will be needed, or any of a variety of other quantities of interest. The UI 122 can assist a user 160 to accept or reject one or more 3D models among the presented 3D models.

In some implementations, the user can select to further update the desired prismatification to generate an updated smoothed model. The user can indicate, e.g., through UI 122, an updated desired prismatification amount such that a new smoothed geometry is reconstructed from the original geometry and the updated smoothed geometry is presented in the UI 122, e.g., replacing the previously presented smoothed geometry or alongside one or more previously presented smoothed geometries.

If the design is rejected, the process of FIG. 1B can return to obtain 180, e.g., by CAD program(s) 116, new criteria, e.g., desired shape prismatification value(s), new selection of the first geometry in the 3D model for use in producing a second geometry from the first geometry. Once a design is not rejected 190, the process of FIG. 1B can provide 195, e.g., by CAD program(s) 116, the model of the object for use in manufacturing a physical structure. The providing 195 can involve sending or saving the 3D model to a permanent storage device for use in manufacturing the physical structure corresponding to the object using manufacturing systems. In some implementations, the providing 195 involves generating 195A, e.g., by CAD program(s) 116, toolpath specifications for computer-controlled manufacturing system(s) using the computer model, and manufacturing 195B, e.g., by CAD program(s) 116, at least a portion of the physical structure corresponding to the object with the computer-controlled manufacturing system(s) using the toolpath specifications. In some implementations, the providing 195 can include manufacturing 195B a mold for a physical structure with a manufacturing machine using the toolpath specification generated 195A, where the computer model can be a model of the mold that will be manufactured using a subtractive manufacturing process. The computer model that is provided 195 can be the computer model produced 185 by the automated shape adjustment method.

In some implementations, a user can indicate, e.g., through a UI of the shape modeling computer program, a selection of at least a portion of a geometry of the 3D model representative of the object and an amount of target prismatification for the selected portion. The selection of at least a portion of the geometry can be the entire 3D model of the object, or less than the entire 3D model of the object.

In some implementations, the shape modeling computer program can provide guidance to the user through the UI on selections of the geometry of the 3D model representative of the object that are candidate regions that are selectable for prismatification. For example, the UI can highlight or otherwise indicate candidate regions for smoothing (e.g., regions where a cross-section of the mesh is approximately circular).

In some implementations, a user may not provide a desired prismatification, in which case, a default value can be applied by the shape modeling computer program. For example, the shape modeling computer program can generate a default value based in part on, for example, an appearance of the first geometry, an indicated end-use of the second geometry, an intended manufacturing method (e.g., 3D printing, 3-axis or 5-axis CNC, etc.), or the like.

An output from the automated shape adjustment methods can be an output model reflecting an organic nature of the original input mesh and having increased smoothness and/or increased prismatic aspects from the original mesh input. For example, the second geometry can preserve a local shape curvature of the first geometry, where gradual transitions can be generated between adjoining unsmoothed regions and regions of high curvature are preserved without over-smoothing.

The output 3D model from the automated shape adjustment method can be provided for use in manufacturing a physical structure corresponding to the object using one or more computer-controlled manufacturing systems. For example, additive and/or subtractive manufacturing systems can be used to produce a physical structure corresponding to the object. The output 3D model can be provided for use in displaying the object on a display screen, e.g., digital projection for a computer animation application.

Automated Shape Adjustment

The shape modeling computer program can produce the second geometry from the first geometry and the indication of the amount of prismatification using an automated shape adjustment process. To produce the second geometry, the shape modeling computer program performs a direct modification to the control mesh of a surface representation of the first geometry, e.g., direct T-spline modification. The control mesh of the surface representation includes a network in three-dimensions of vertices (e.g., also referred to as "nodes"), where the vertices are connected by edges and together, the network defines a continuous surface. In this method, the modifications are made locally at vertices of the control mesh to reduce curvature, but without forcing the network to conform to cylindrical shapes. Moreover, the modifications can be applied to portions, or the entirety (with or without the preserve regions), of a 3D model without abrupt transitions between regions where modifications are applied versus not applied.

At a high level, the methods include taking three consecutive (adjacent) vertices of a set of vertices selected along a direction of a two-dimensional unwrapped representation of the control mesh to form an arc. The arc defines a loop (e.g., circle) having a radius and a center point for the loop. For the set of vertices, a set of arcs will generate a set of radii and a set of corresponding center points. Within a distance tolerance (e.g., as defined based on the indicated amount of prismatification), a subset of the vertices forming the respective arcs will have a threshold overlap of their respective center points. The vertices found to have a threshold overlap of their respective center points (e.g., the distance between two center points is less than the distance tolerance) form a group of vertices that the shape modeling computer program adjusts relative to a cylinder generated based on the locations of all vertices of the set of vertices.

Sets of vertices are considered independently by the shape modeling computer program, where adjustment(s) of vertices of a set of vertices are independent of each other adjustments of the other sets of vertices. The shape modeling computer program can modify each set of vertices in turn, e.g., along a direction perpendicular to the indicated direction of the two-dimensional unwrapped representation of the control mesh. In this way, the shape modeling computer program only modifies positions of vertices that are within a threshold distance tolerance. For example, for regions where a curvature of the 3D model is less than a threshold curvature, the shape modeling computer program can apply minimal or no modifications to the regions. The shape modeling computer program can apply graduated (e.g., tapered) modifications in regions with graduated curvature to reduce abrupt changes between modified and unmodified regions. Additionally, for regions with inconsistent changes in curvature (e.g., regions of high curvature adjacent to regions with low curvature), the shape modeling computer program can apply minimal or no modifications to the regions.

In some implementations, a user can control where to apply the modifications on the 3D model, e.g., by selecting regions of the 3D model to apply the modifications. Additionally, the user can indicate a direction along which to apply the modification, e.g., using radial and/or linear modification, to the 3D model to generate the second geometry and can restrict the shape modeling computer program from applying the methods to specific features and/or preserves.

In some implementations, a user can adjust an amount of prismatification to produce the second geometry to adjust a smoothing effect of the second geometry. In other words, by increasing an amount of prismatification the shape modeling computer program uses an increased distance tolerance to determine which vertices are adjusted, resulting in a smoother, more prismatic (and less organic) output 3D model since more vertices are repositioned to move the geometry of the 3D model closer to a prismatic shape (e.g., closer to a cylinder).

Figure 2:
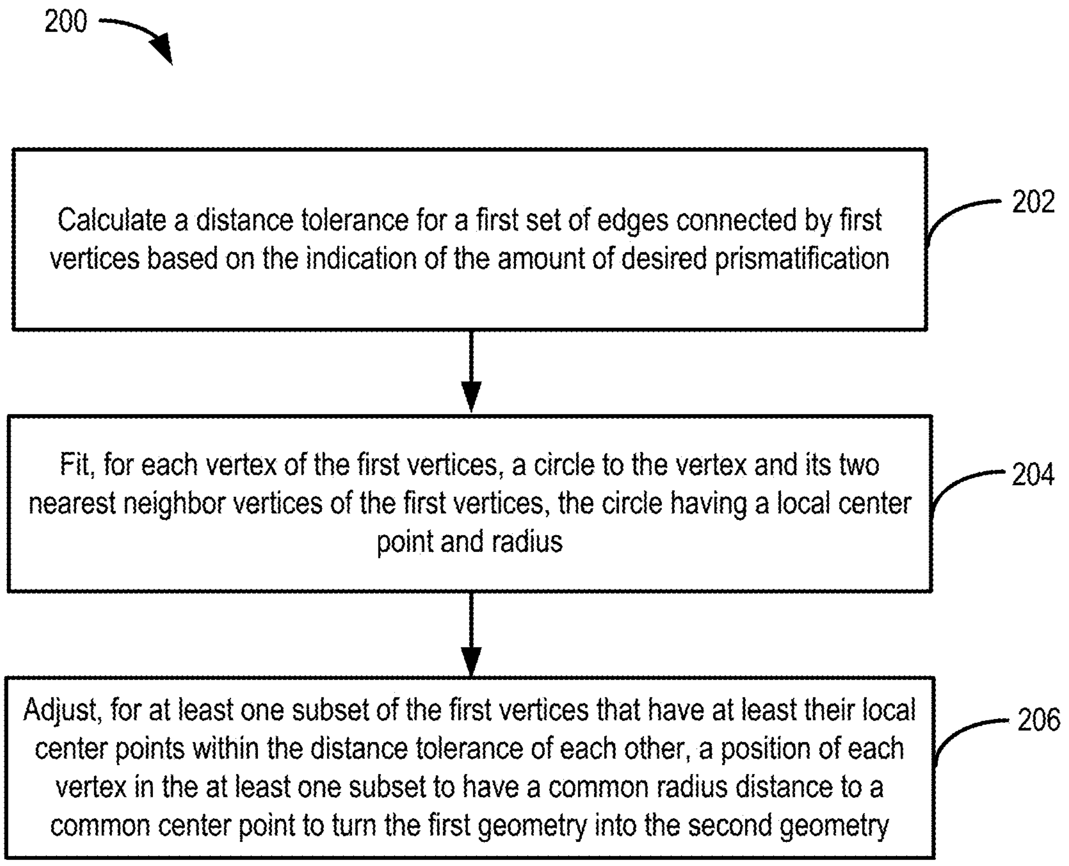
FIG. 2 is a flow diagram of an example of an automated shape adjustment process.
Figure 3:
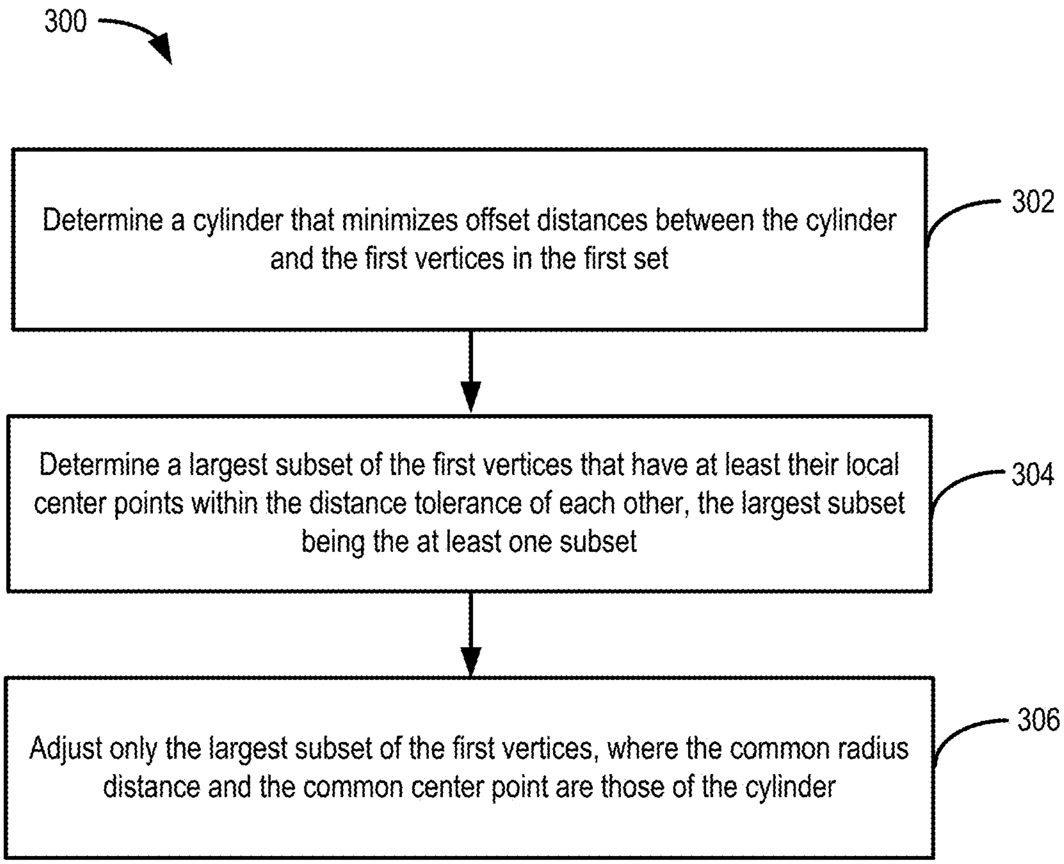
FIG. 3 is a flow diagram of an example of an automated shape adjustment process.
Figure 4:
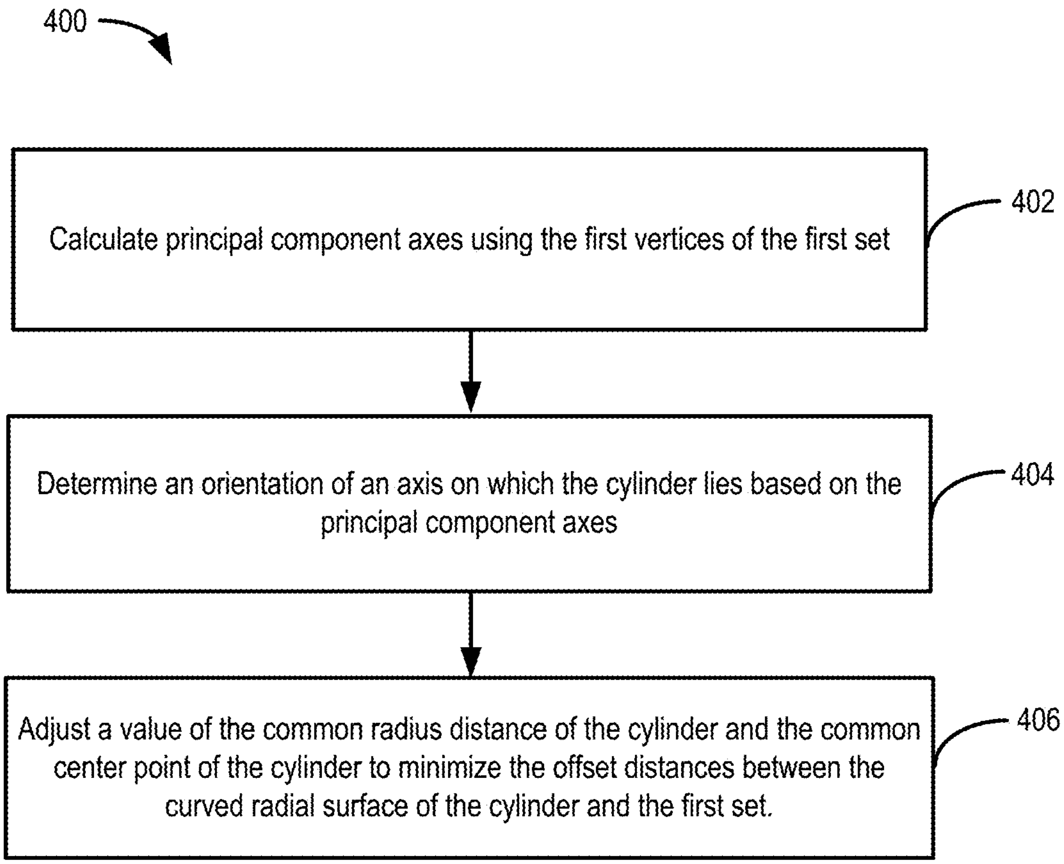
FIG. 4 is a flow diagram of an example of an automated shape adjustment process.

FIGS. 2-4 are flow diagrams of examples of automated shape adjustment processes that can be used to produce, e.g., produce 185, the second geometry. For convenience, the processes of FIGS. 2-4 will be described as being performed by a shape modeling computer program operating on a system of one or more computers, located in one or more locations, and programmed appropriately in accordance with this specification.

As described above, a user can provide a selection of a first geometry and an amount of prismatification to the shape modeling computer program. Prismatification includes, for example, (A) a smoothing operation applied to the first geometry and (B) a ratio of organic features versus prismatic features between the first geometry and the second geometry. The user selected first geometry can be selected portion(s) of the 3D model, or an entirety of the 3D model. The selected portion(s) of the 3D model can include only the organic portion of the 3D model (e.g., generatively designed portions of the 3D model), i.e., everything but the preserve geometry.

Figure 5:
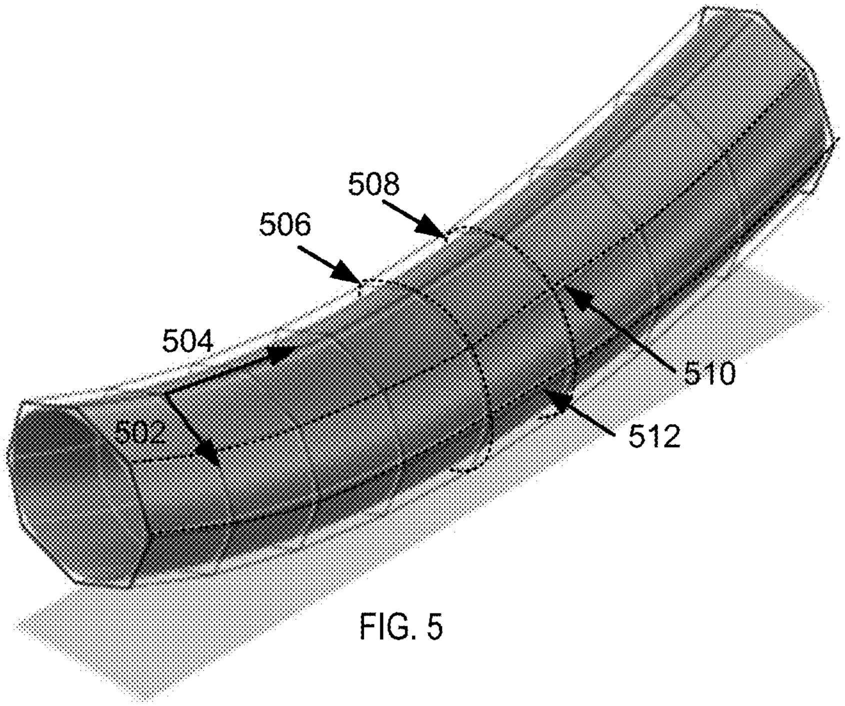
FIG. 5 is a schematic of an example of a control mesh for a smooth surface representation of a 3D model of an object.
Figure 6:
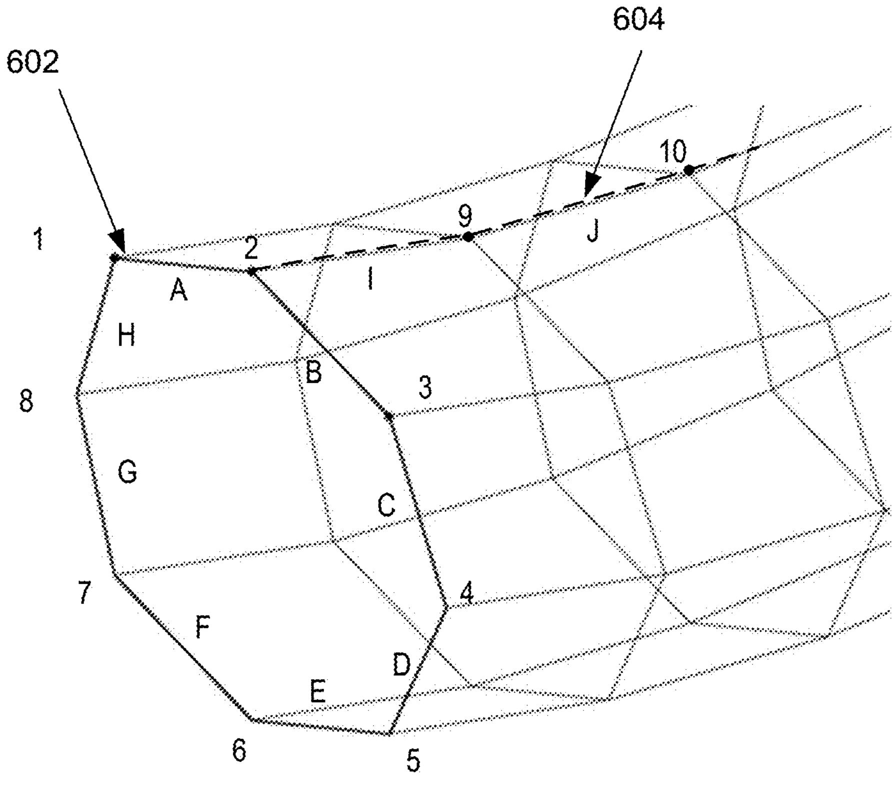
FIG. 6 is a schematic illustrating an example of a process of automated shape adjustment.

FIG. 2 is a flow diagram of an example of an automated shape adjustment process 200. As depicted in FIG. 5, the shape modeling computer program can receive a selection of a first geometry as a control mesh for a smooth surface representation of a 3D model of an object. The control mesh includes edges connected by vertices. To produce a second geometry from the first geometry, the shape modeling computer program applies the automated shape adjustment method to a selected set(s) of vertices connected by edges of the control mesh. The selected set(s) of vertices correspond to an edge sequence(s) corresponding to an ordered set of connected edges. Edge sequence(s) can include, for example, radially-defined edge sequences (e.g., also referred to as "closed loops" or "closed edge loops"), longitudinally-defined edge sequences (e.g., also referred to as "open loops" or "open edge loops"), or a combination thereof. For example, FIG. 6 depicts a radially-defined (e.g., closed) loop 602 of edges A, B, C, D, E, F, G, and H connected by vertices 1, 2, 3, 4, 5, 6, 7, and 8, and a longitudinally-defined (e.g., open) loop 604 of edges I, J connected by vertices 2, 9, and 10. Although described with reference to FIG. 2 as applied to one set of vertices, e.g., vertices 1-8 of FIG. 6, of the selected first geometry, the shape modeling computer program can produce the second geometry by applying the process of FIGS. 2-4 to multiple sets of vertices connected by respective edges, as will be described in further detail below.

In some implementations, the shape modeling computer program further receives an indication of direction(s) as defined by an unwrapped, two-dimensional version of the first geometry defining of the vertices to include in the set(s) of vertices. For example, a direction 502 in FIG. 5 can indicate that the sets of vertices are radially-defined sets, e.g., sets of vertices in edge loop 506 and edge loop 508. In another example, a direction 504 in FIG. 5 can indicate that the sets of vertices are longitudinally-defined sets, e.g., sets of vertices in edge loop 510 and edge loop 512. The indication of direction can be provided by a user to the shape modeling computer program, e.g., as part of the selection of the first geometry. In the case where the user does not indicate a direction, the shape modeling computer program can use default direction(s), e.g., applying the automated shape adjustment methods along radially and/or longitudinally defined sets of vertices. The direction can indicate, for example, a closed loop or open loop of the control mesh, where the set of the edges are connected along the indicated direction specified of one or two directions in the unwrapped, two-dimensional version of the first geometry. In other words, the direction can indicate radially or longitudinally defined sets of vertices.

The shape modeling program calculates (202) a distance tolerance for a set of edges connected by vertices based on the indication of the amount of desired prismatification. For example, the amount of desired prismatification can be defined as a percentage of an average or median length of edges in the first set of vertices. In another example, the amount of desired prismatification can be defined as a standard deviation, or another calculation related to the length of the edges in the set of vertices.

In some implementations, for a prismatification factor, f, where 0.0<f<1.0, the distance tolerance is given by:

$$\bar{d} = \frac{f}{n}\sum_{i=1}^{n} d_i \tag{1}$$

where $d_i$ is the edge length from vertex $v_i$+1 to $v_i$ given by:

$$d_i = |v_{i+1} - v_i| \tag{2}$$

for 1<=i<=n

For sets of neighboring sequences of edges forming a rectangular grid of (i, j) edges, a weighted average can be used:

$$\bar{d} = \frac{f}{n}\sum_{i=1}^{n} w_i d_i \tag{3}$$

where the weights $w_i$ sum to 1. These can be based on the reciprocal of the variance in the secondary j direction:

$$w_i = \frac{1}{\sigma^{i^2}} \tag{4}$$

where the weights are subsequently normalized to sum to 1.

Figure 7A:
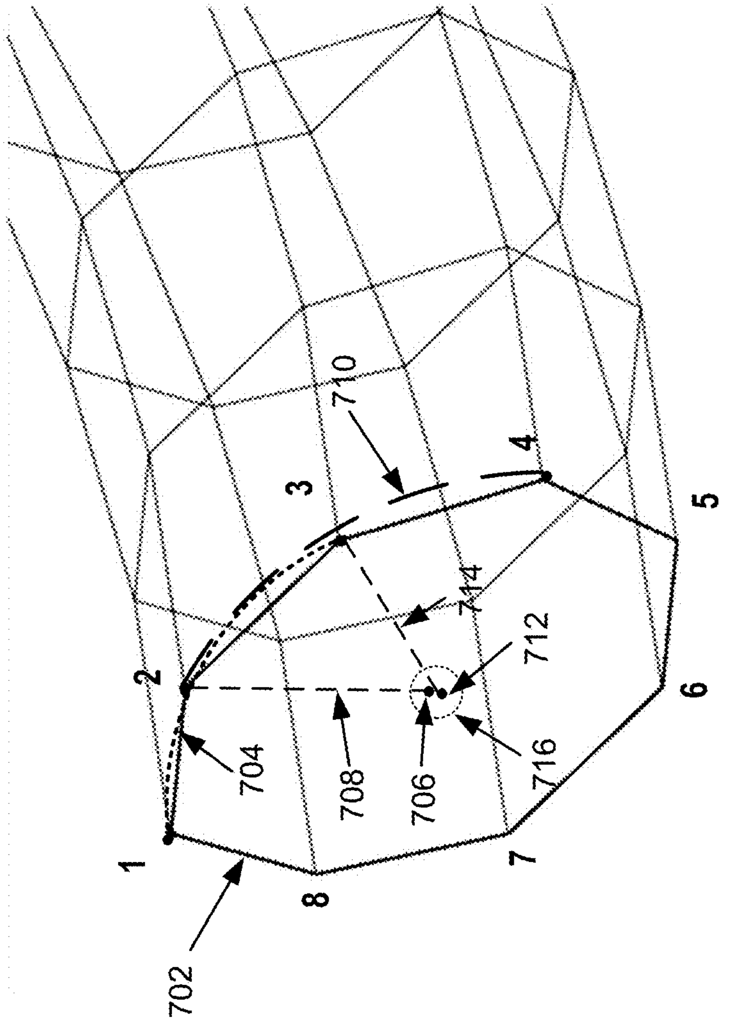
FIGS. 7A-7B are schematics illustrating examples of processes of automated shape adjustment.

The shape modeling computer program fits (204), for each vertex of the set of vertices, a circle to the vertex and at least its two nearest neighbor vertices of the set of vertices. The circle for the vertex and its two nearest neighbor vertices has a local center point and a radius. FIG. 7A is a schematic illustrating an example of processes of automated shape adjustment. As depicted in FIG. 7A, vertex 2 of the radial set of vertices 702 forms an arc 704 with its nearest neighbors of the set of vertices 702, vertices 1 and 3. The arc 704 has a local center point 706 and a local radius 708, corresponding to a circle (not shown) defined by the arc 704. In another example, vertex 3 of the radial set of vertices 702 forms an arc 710 with its nearest neighbors of the set of vertices 702, vertices 2 and 4. The arc 710 has a local center point 712 and a local radius 714, corresponding to a circle (not shown) defined by the arc 710.

Referring to FIG. 2, the shape modeling computer program adjusts (206), for a subset vertices of the set of vertices that have at least their local center points within the distance tolerance of each other, a position of each vertex in the subset to have a common radius distance to a common center point to turn the first geometry into the second geometry. As depicted in FIG. 7A, the distance tolerance can define an area 716 within which the subset of vertices (e.g., vertices 2,3) having local center points of the arcs fall. The subset of vertices can then be adjusted to a common radius distance to a common center point. For example, as depicted in FIG. 7B, the positions of the subset of vertices can be adjusted to have their respective center points fall on a common radius 720 to a common center point 722 for a circle 718.

Figure 7B:
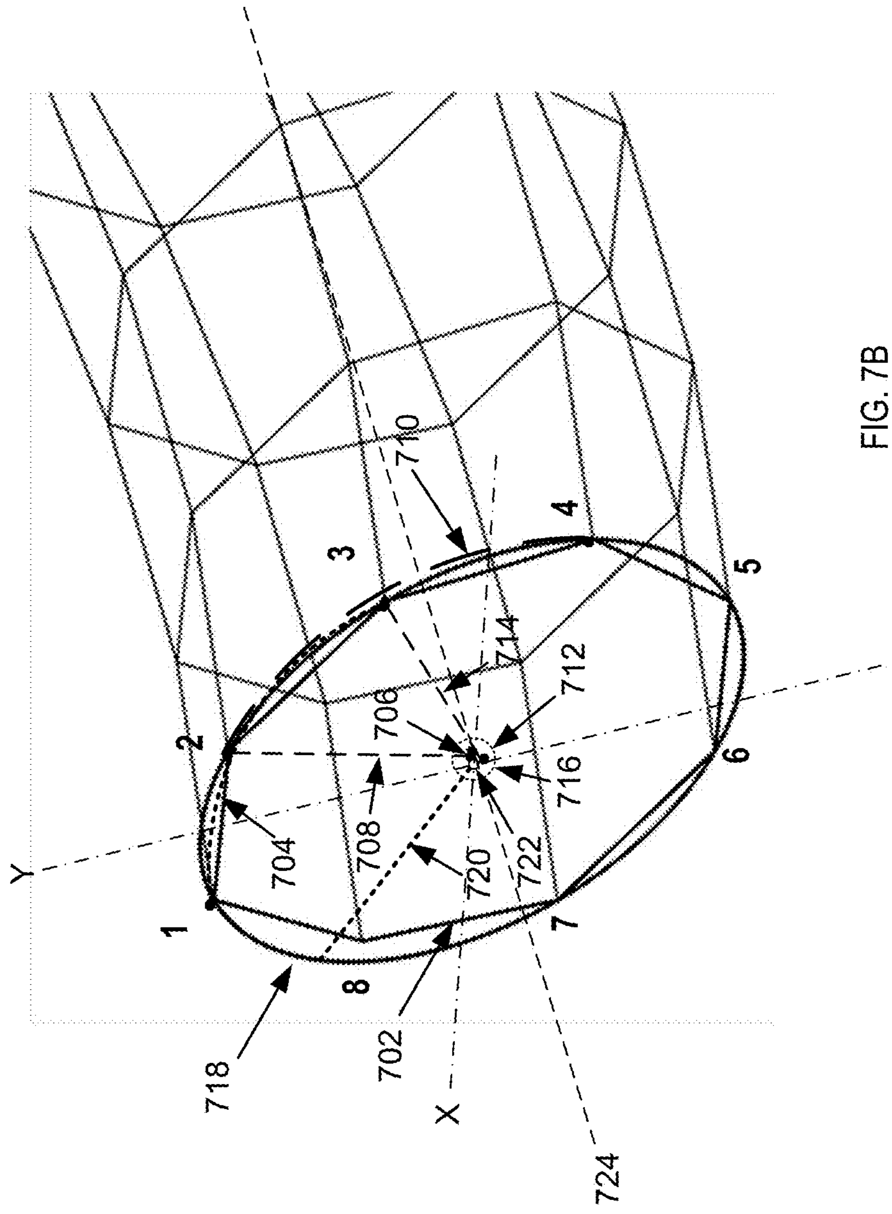

In some implementations, the shape modeling computer program determines a common radius to a common center point by determining a cylinder from the positions of the set of vertices, e.g., vertices 1-8 of FIGS. 6, 7A-7B. As depicted in the example process 300 of FIG. 3, the shape modeling computer program determines (302) a cylinder that minimizes offset distances between the curved radial surface of the cylinder and locations of the set of vertices. For example, as depicted in FIG. 7B, shape modeling computer program determines a cylinder including a circle 718 based on positions of all of the vertices 1-8 of the radial set of vertices 702. Further details for determining the cylinder are described with reference to FIG. 4 below. Although described herein as the shape modeling computer program determining a cylinder that minimizes the offset distances, other prismatic shapes can be used, for example, a rectangular prism or a radiused rectangular prism.

The shape modeling computer program determines (304) the subset of the vertices of the set of vertices that have at least their local center points within the distance tolerance of each other. The subset of vertices can include all vertices of the set of vertices that are determined to have their local center points within the distance tolerance of each other. As such, the subset of vertices includes at least two of the vertices of the set of vertices and, at most, all of the vertices of the set of vertices, e.g., at least two and at most all of vertices 1-8 in FIGS. 6-7B.

In some implementations, the shape modeling computer program determines the subset as the largest subset of the vertices in the set of vertices that have at least their local radii within the distance tolerance of each other. A distance tolerance for defining the subset of vertices having their local center points within the distance tolerance of each other can be a different or same distance tolerance for defining the subset of vertices having their local radii within the distance tolerance of each other.

The shape modeling computer program adjusts (306) only the largest subset of the set of vertices, where the common radius distance and the common center point are those of the cylinder. In other words, only vertices that are already close to being on the common circle, e.g., circle 718, defined by the cylinder having a common radius distance to the common center point are moved, where "closeness" is the controllable variable. As such, fewer than every vertex of the set of vertices may be adjusted as part of the process to produce the second geometry depending on the nature of the geometry and the specified amount of prismatification. Vertices that are outside the threshold distance tolerance are not moved, which can result in a more subtle smoothing such that distinct non-radial features of the mesh are preserved while smoothing out smaller features, producing better (e.g., smoother, more manufacturable) 3D models.

In some implementations, adjusting vertices of each set of edges of the sets of edges of the first geometry includes adjusting vertices of each set of edges of the sets of edges of the first geometry independently from each other of the sets of edges connected by vertices and along a second direction perpendicular to the indicated first direction in the unwrapped, two-dimensional version of the first geometry. In other words, modifications to positions of vertices of a set of vertices are made with respect to the set and independently (i.e., irrespective) of the adjustments made in other sets of vertices. For example, modifications made to vertices in the edge loop 506 are made independently to the modifications made to vertices in the edge loop 508. In another example, modifications made to vertices in the edge loop 506 are made independently to the modifications made to vertices in the edge loop 510. In another example, modifications made to vertices in edge loop 510 are made independently to the modifications made to vertices in edge loop 512.

In some implementations, a vertex of the 3D model can be adjusted as part of more than one set of vertices connecting edges. For example, vertex 2 is a part of a first closed loop 602 including a first set of vertices and also part of an open loop 604 including a second set of vertices. Each of the sets of vertices can be analyzed and one or more vertices is adjusted for the respective set, independently of adjustments made for the other set. As such, the modifications can be applied to both directions 502 and 504 (i.e., radially and longitudinally), or restricted to a single direction.

As described above, the shape modeling computer program can determine a common radius to a common center point of a cylinder to use for adjusting the position(s) of the largest subset of vertices of the set of vertices. FIG. 4 is a flow diagram of an example of an automated shape adjustment process 400. The shape modeling computer program calculates (402) principal component axes using the vertices of the set.

The shape modeling computer program determines (404) an orientation of an axis on which the cylinder lies based on the principal component axes. Determining the principal component axes using the vertices of the set of vertices can be performed, for example, as detailed in *Guide to Computational Geometry Processing: Foundations, Algorithms, and Methods*, J. Andreas Bærentzen, Jens Gravesen, François Anton, Henrik Aanæs, p. 296.

As depicted in FIG. 7B, the axis 724 on which the cylinder lies is based on the determination of the principal component axes XY. The shape modeling program determines the principal component axes from the locations of all the vertices of the set of vertices. For example, the shape modeling computer program determines the principal component axes XY from the locations of the set of vertices 1-8. As detailed above, while only the largest subset of vertices that are found to have local center points within a distance tolerance of the common center point are adjusted (i.e., only on-a-local-circle vertices are moved), the cylinder is determined based on the positions of all the vertices of the set of vertices. By adjusting the largest subset of vertices based on the cylinder determined from all the set of vertices and not according to a local circle, the shape modeling computer program can produce improved (e.g., smoother and more manufacturable) 3D models while also maintaining some of the organic character of the shape of the original geometry.

The shape modeling computer program adjusts (406) a value of the common radius distance of the cylinder and the common center point of the cylinder to minimize the offset distances between the curved radial surface of the cylinder and the set of vertices. For example, a position of vertex 2 can be adjusted such that the vertex 2 lies on the perimeter of circle 718 of the cylinder having common center point 722.

Figure 8:
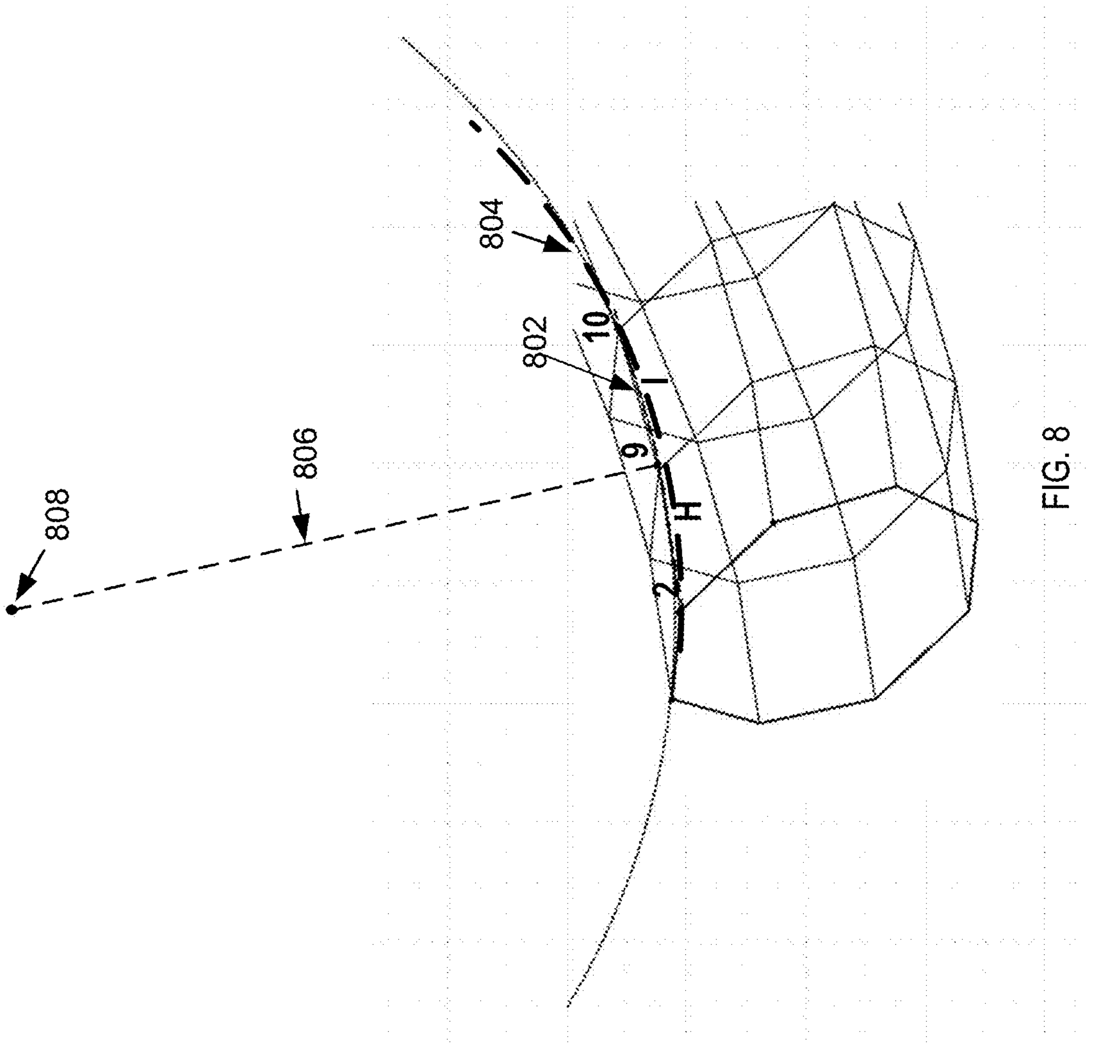
FIG. 8 is a schematic illustrating an example of a process of automated shape adjustment.

Although described with reference to FIGS. 2-4 as a radial set of vertices, a longitudinal set of vertices can be used to apply the smoothing processes. FIG. 8 is a schematic illustrating an example of a process of automated shape adjustment. A longitudinal direction, e.g., direction 504 of FIG. 5, can be indicated by a user through a user interface. A set of vertices aligned with the direction can form an open edge loop. The open edge loop 802 includes vertices 2, 9, and 10 connecting edges H and I of the control mesh. Similar to the processes described with reference to FIGS. 7A-7B, the shape modeling computer program calculates a distance tolerance for the set of vertices and edges forming the open edge loop 802 based on the indication of the amount of prismatification. For each vertex in the set of vertices, the shape modeling computer program fits a circle to the vertex and its two nearest neighbor vertices in the set of vertices. For example, an arc 804 representative of a circle having a local radius 806 to a local center point 808 is fitted for vertex 9 and its adjacent nearest neighbor vertices 1 and 10. Although depicted in FIG. 8 as a set of three vertices 1, 9, and 10, the open loop edge 802 can include additional vertices along the longitudinal direction.

In some implementations, the fitted circles corresponding to a vertex and its two nearest neighbor vertices need not fall within the boundaries of the control mesh. For example, as depicted in FIG. 8, the local radius 806 to local center point 808 of an arc 804 formed by vertices 2, 9, and 10 is located outside the control mesh of the 3D model. As such, a common radius to a common center point of a cylinder generated from the vertices of the set of vertices along the longitudinal direction can also be outside the control mesh of the 3D model.

In some implementations, a user interface (UI) of the shape modeling computer program includes a comparative display of the first geometry and the second geometry, e.g., as overlapping or side-by-side renderings. A matching function can be used by the shape modeling program to highlight, outline, or otherwise identify for a user the differences between the first and second geometries to facilitate adjusting the second geometry with respect to the first geometry. A user can interact with the UI to adjust an amount of prismatification used for constructing the second geometry. For example, adjusting the prismatification amount can impact a construction of a ratio of organic versus prismatic characteristics of the control mesh for the smooth surface representation of the second geometry.

In some implementations, a user can view the generated second geometry and adjust the input parameters to regenerate the second model and view the impact of the prismatification amount, in order to achieve a target prismatification (e.g., smoothing) and/or gain understanding of what a prismatification looks like in real-time.

Figure 10:
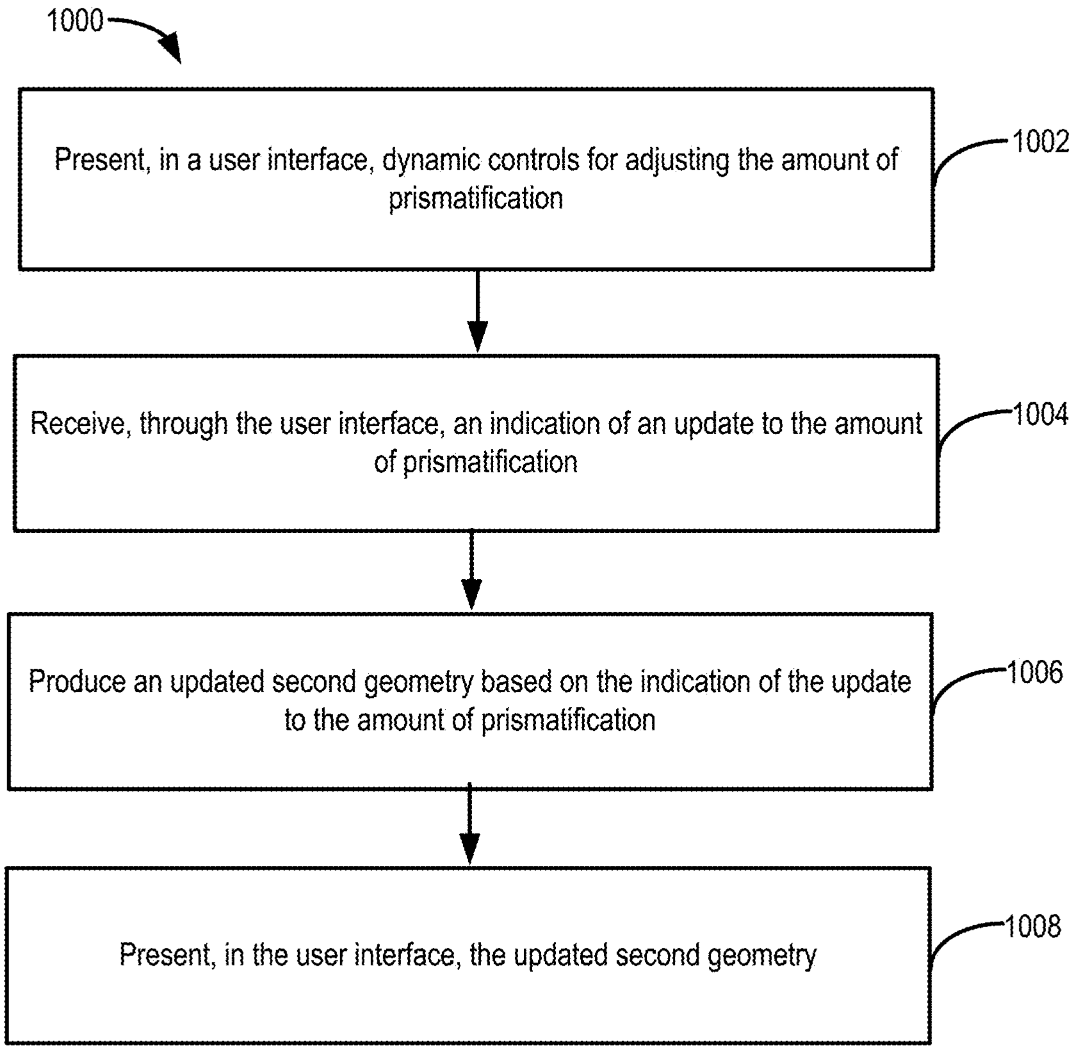
FIG. 10 is a flow diagram of an example of an automated shape adjustment process.

FIG. 10 is a flow diagram of an example of an automated shape adjustment process 1000. The shape modeling computer program can present 1002 dynamic controls for adjusting the amount of prismatification in a user interface, e.g., UI 122. Dynamic controls can include, for example, a sliding scale bar, dial, knob, or another virtual adjustable indicator that the user can manipulate to update the amount of prismatification.

Figure 9B:
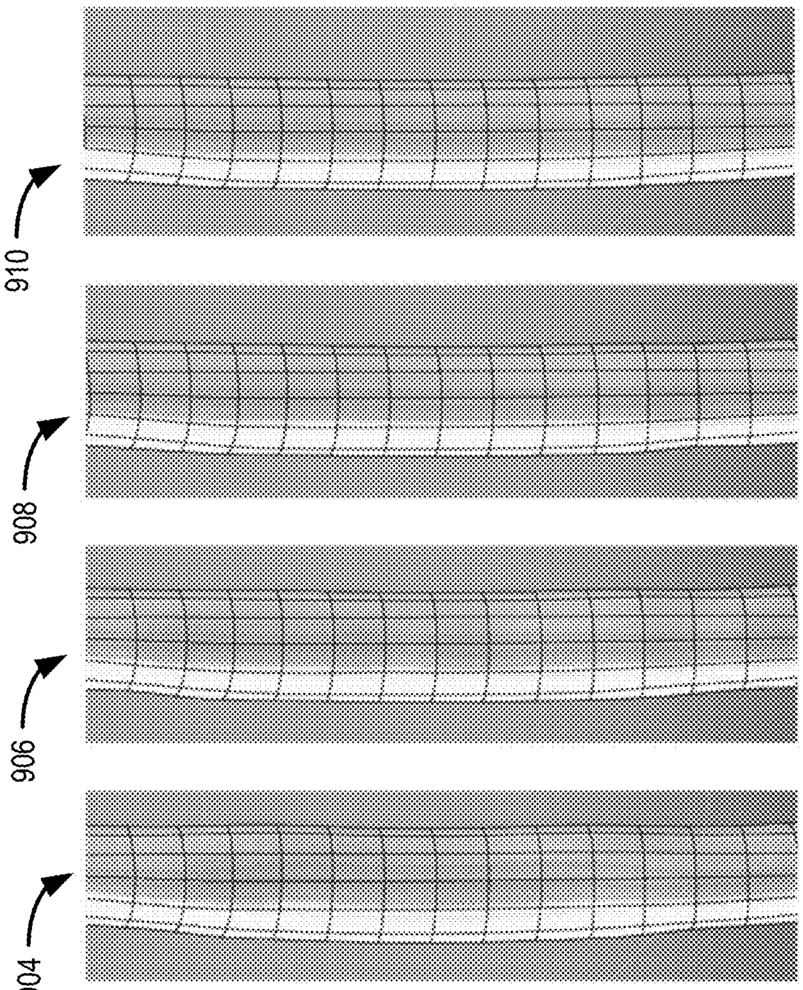
FIGS. 9A-9B are schematics illustrating examples of results of automated shape adjustment processes.
Figure 9A:
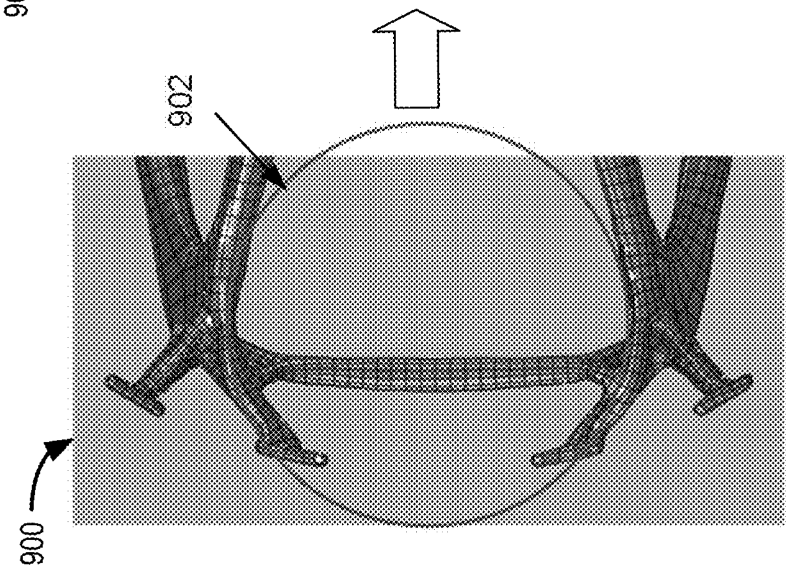

The computer program can receive 1004 an indication of an update to the amount of prismatification from a user through the user interface and produce 1006 an updated second geometry based on the indication of the update to the at least one of the one or more construction parameters. For example, the user can select a first geometry in the user interface to produce the second geometry, e.g., the user can select a first geometry 902 of an example control mesh 900 of a 3D model depicted in FIG. 9A. A user of the UI can view the effects of increasing prismatification, e.g., by interacting with dynamic input controls 123 to adjust the prismatification and viewing the produced second geometry. The computer program presents 1008 the updated second geometry in the user interface for review by the user. For example, the user may view the second geometries 904, 906, 908, and 910 side-by-side (e.g., as depicted in FIG. 9B) to perform a visual comparison of the produced second geometries. In some implementations, the computer program presents two or more generated second geometries corresponding to respective values for the one or more construction parameters to assist the user in understanding impacts of adjusting the one or more construction parameters on the second geometry.

Figure 11:
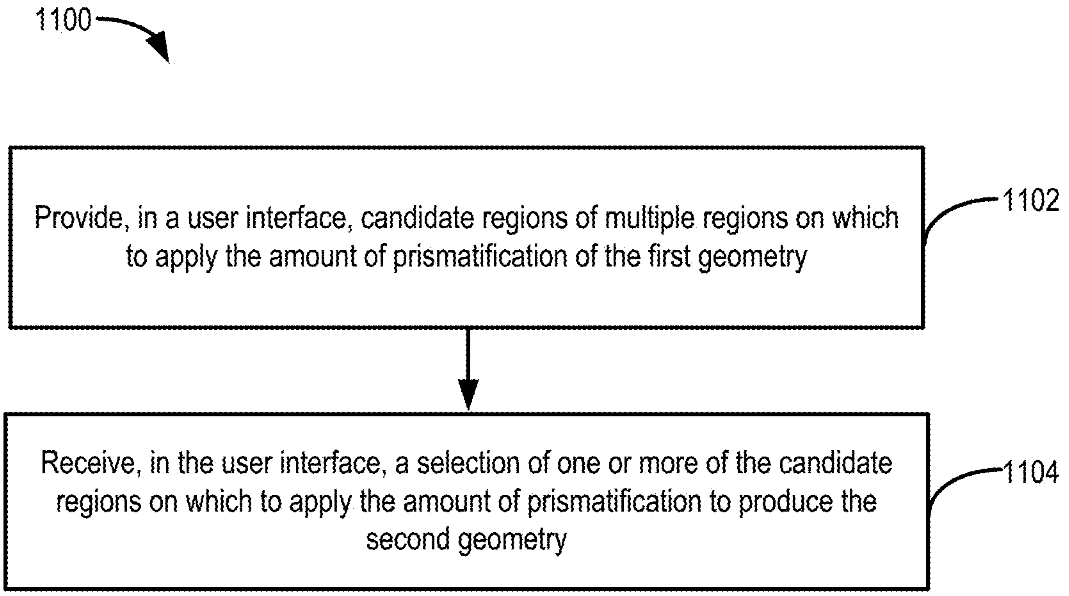
FIG. 11 is a flow diagram of an example of an automated shape adjustment process.

In some implementations, the shape modeling computer program can provide guidance to the user through the UI on selections of the geometry of the 3D model representative of the object that are candidate regions that are selectable for smoothing/prismatification. FIG. 11 is a flow diagram of an example of an automated shape adjustment process 1100. The shape modeling computer program provides 1102 candidate regions of multiple regions on which to apply the amount of prismatification to the first geometry. For example, the UI can highlight, outline, or otherwise indicate candidate regions. The shape modeling computer program can select candidate regions, for example, based in part on regions where the curvature of the 3D model is fairly constant (e.g., less than a threshold variation) along a sequence of edges. The computer program receives 1104 a user selection of one or more of the candidate regions on which to apply an automated shape adjustment process in addition to, or instead of, user-identified geometry selections of the 3D model.

Figure 12:
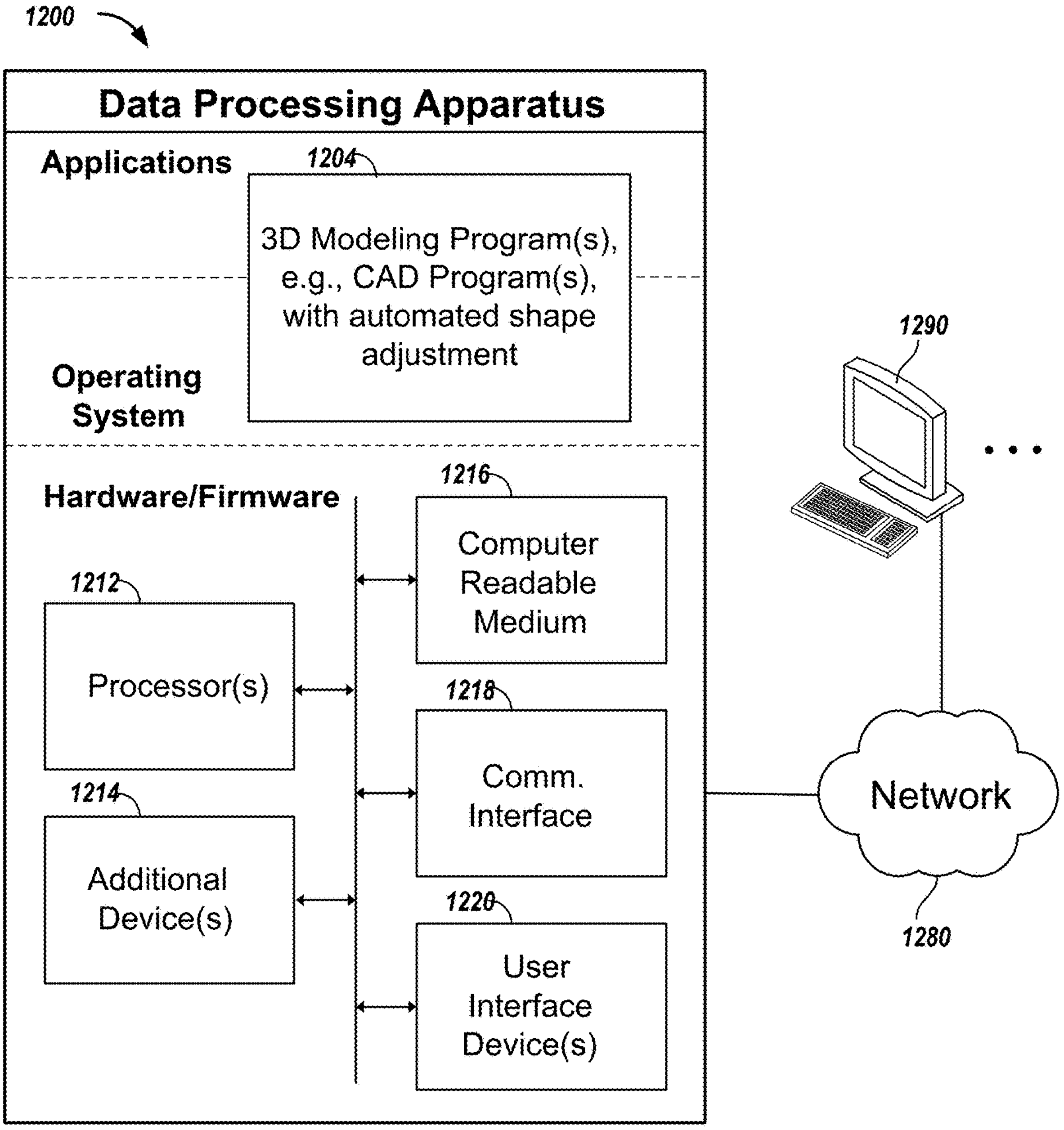
FIG. 12 is a schematic diagram of a data processing system including a data processing apparatus, which can be programmed as a client or as a server, and can implement the techniques described in this document.

FIG. 12 is a schematic diagram of a data processing system including a data processing apparatus 1200, which can be programmed as a client or as a server. The data processing apparatus 1200 is connected with one or more computers 1290 through a network 1280. While only one computer is shown in FIG. 12 as the data processing apparatus 1200, multiple computers can be used. The data processing apparatus 1200 includes various software modules, which can be distributed between an applications layer and an operating system. These can include executable and/or interpretable software programs or libraries, including tools and services of one or more 3D modeling programs 1204 that implement automated shape adjustment and/or automated shape adjustment, as described above. Thus, the 3D modeling program(s) 1204 can be CAD program(s) 1204 (such as CAD program(s) 116) and can implement one or more automated shape generation methods and/or one or more automated shape adjustment methods. Further, the program(s) 1204 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 1200 also includes hardware or firmware devices including one or more processors 1212, one or more additional devices 1214, a computer readable medium 1216, a communication interface 1218, and one or more user interface devices 1220. Each processor 1212 is capable of processing instructions for execution within the data processing apparatus 1200. In some implementations, the processor 1212 is a single or multi-threaded processor. Each processor 1212 is capable of processing instructions stored on the computer readable medium 1216 or on a storage device such as one of the additional devices 1214. The data processing apparatus 1200 uses the communication interface 1218 to communicate with one or more computers 1290, for example, over the network 1280. Examples of user interface devices 1220 include a display, a camera, a speaker, a microphone, a tactile feedback device, a keyboard, a mouse, and VR and/or AR equipment. The data processing apparatus 1200 can store instructions that implement operations associated with the program(s) described above, for example, on the computer readable medium 1216 or one or more additional devices 1214, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:

obtaining, by a shape modeling computer program, a selection of first geometry defined in a data structure used by the shape modeling computer program to represent a three-dimensional model of an object and an indication of an amount of desired prismatification, wherein the first geometry is defined in the data structure using a control mesh for a smooth surface representation of the first geometry;

producing, by the shape modeling computer program, second geometry defined in the data structure based on the indication of the amount of desired prismatification, wherein the second geometry replaces the first geometry in representing the three-dimensional model of the object, wherein the control mesh comprises edges connected by vertices, and the producing comprises, for at least a first set of the edges connected by the vertices, the first set comprising first edges and first vertices:

calculating a distance tolerance for the first edges and the first vertices based on the indication of the amount of desired prismatification;

fitting, for each vertex in the first vertices, a circle to the vertex and its two nearest neighbor vertices in the first set, the circle having a local center point and radius; and adjusting, for at least one subset of the first vertices that have at least their local center points within the distance tolerance of each other, a position of each vertex in the at least one subset to have a common radius distance to a common center point to turn the first geometry into the second geometry; and providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

2. The method of claim 1, wherein the producing comprises:

determining a cylinder that minimizes offset distances between the cylinder and the first vertices in the first set; and determining a largest subset of the first vertices that have at least their local center points within the distance tolerance of each other, the largest subset being the at least one subset;

wherein the adjusting is performed on only the largest subset of the first vertices, and the common radius distance and the common center point are those of the cylinder.

3. The method of claim 2, wherein determining the cylinder that minimizes the offset distances between the cylinder and the first vertices in the first set comprises:

calculating principal component axes using the first vertices of the first set;

determining an orientation of an axis on which the cylinder lies based on the principal component axes; and adjusting a value of the common radius distance of the cylinder and the common center point of the cylinder to minimize the offset distances between a curved radial surface of the cylinder and the first set.

4. The method of claim 2, wherein determining the largest subset of the first vertices that have at least their local center points within the distance tolerance of each other further comprises determining the largest subset of the first vertices that have at least their local radii within the distance tolerance of each other.

5. The method of claim 1, wherein the control mesh comprises a T-spline surface representation, wherein the first set of the edges connected by the first vertices form a continuous closed edge loop, and wherein the producing further comprises, for a second set of the edges connected by the vertices, the second set comprising second edges and second vertices, and wherein the second set of the second edges connected by the second vertices form an open edge loop:

calculating a second distance tolerance for the second edges and the second vertices based on the indication of the amount of desired prismatification;

fitting, for each vertex in the second vertices, a circle to the vertex and its two nearest neighbor vertices in the second set, the circle having a local center point and radius; and adjusting, for at least one subset of the second vertices that have at least their local center points within the second distance tolerance of each other, a position of each vertex in the at least one subset to have a common radius distance to a common center point to turn the first geometry into the second geometry.

6. The method of claim 1, wherein the obtaining comprises obtaining an indication of one or two directions as defined by an unwrapped, two-dimensional version of the first geometry, and wherein the at least the first set of the edges are connected along a first direction specified by the indication of one or two directions in the unwrapped, two-dimensional version of the first geometry, and wherein the producing further comprises, for a second set of the edges connected along the first direction of the one or two directions in the unwrapped, two-dimensional version of the first geometry, fitting, for each vertex in the vertices of the second set of edges, a respective circle to the vertex and its two nearest neighbor vertices in the second set of edges, the circle having a local center point and radius; and adjusting, for at least one subset of the vertices of the second set of edges that have at least their local center points within the distance tolerance of each other, a position of each vertex in the at least one subset to have a common radius distance to a common center point to turn the first geometry into the second geometry.

7. The method of claim 6, wherein the producing comprises adjusting vertices of each set of edges of the first set of edges and the second set of edges of the first geometry independently from each other, and along a second direction perpendicular to the indicated first direction in the unwrapped, two-dimensional version of the first geometry.

8. The method of claim 1, wherein the control mesh comprises a T-Spline control mesh generated from a polygon mesh output from an automatic 3D geometry generation algorithm.

9. The method of claim 1, further comprising:

presenting, through a user interface, a representation of the three-dimensional model of the object and one or more candidate regions of the three-dimensional model on which to apply a prismatification operation; and receiving, through the user interface, the selection of the first geometry of the three-dimensional model of the object on which to apply the prismatification operation to produce the second geometry.

10. The method of claim 1, further comprising:

presenting, in a user interface, dynamic controls for adjusting an amount of prismatification of the first geometry to form the second geometry;

receiving, through the user interface, an indication of an update to the amount of prismatification;

producing, an updated second geometry defined in the data structure based on the indication of the update to the amount of prismatification, wherein the updated second geometry replaces the second geometry in representing the three-dimensional model of the object; and presenting, in the user interface, the updated second geometry.

11. The method of claim 10, wherein producing the updated second geometry defined in the data structure based on the indication of the update to the prismatification, comprises calculating an updated distance tolerance for the edges and the vertices based on the indication of the updated amount of prismatification.

12. A system comprising:

one or more computers and one or more storage devices on which are stored instructions that are operable, when executed by the one or more computers, to cause the one or more computers to perform operations comprising:

obtaining, by a shape modeling computer program, a selection of first geometry defined in a data structure used by the shape modeling computer program to represent a three-dimensional model of an object and an indication of an amount of desired prismatification, wherein the first geometry is defined in the data structure using a control mesh for a smooth surface representation of the first geometry;

producing, by the shape modeling computer program, second geometry defined in the data structure by modifying one or more portions of the control mesh of the first geometry using the indication of the amount of desired prismatification, wherein the second geometry replaces the first geometry in representing the three-dimensional model of the object, wherein the control mesh comprises edges connected by vertices, and the producing comprises, for at least a first set of the edges connected by the vertices, the first set comprising first edges and first vertices:

calculating a distance tolerance for the first edges and the first vertices based on the indication of the amount of desired prismatification;

fitting, for each vertex in the first vertices, a circle to the vertex and its two nearest neighbor vertices in the first set, the circle having a local center point and radius; and adjusting, for at least one subset of the first vertices that have at least their local center points within the distance tolerance of each other, a position of each vertex in the at least one subset to have a common radius distance to a common center point to turn the first geometry into the second geometry; and providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

13. The system of claim 12, wherein the producing comprises:

determining a cylinder that minimizes offset distances between the cylinder and the first vertices in the first set; and determining a largest subset of the first vertices that have at least their local center points within the distance tolerance of each other, the largest subset being the at least one subset;

wherein the adjusting is performed on only the largest subset of the first vertices, and the common radius distance and the common center point are those of the cylinder.

14. The system of claim 13, wherein determining the cylinder that minimizes the offset distances between the cylinder and the first vertices in the first set comprises:

calculating principal component axes using the first vertices of the first set;

determining an orientation of an axis on which the cylinder lies based on the principal component axes; and adjusting a value of the common radius distance of the cylinder and the common center point of the cylinder to minimize the offset distances between a curved radial surface of the cylinder and the first set.

15. The system of claim 13, wherein determining the largest subset of the first vertices that have at least their local center points within the distance tolerance of each other further comprises determining the largest subset of the first vertices that have at least their local radii within the distance tolerance of each other.

16. One or more non-transitory computer storage media encoded with computer program instructions that when executed by one or more computers cause the one or more computers to perform operations comprising:

obtaining, by a shape modeling computer program, a selection of first geometry defined in a data structure used by the shape modeling computer program to represent a three-dimensional model of an object and an indication of an amount of desired prismatification, wherein the first geometry is defined in the data structure using a control mesh for a smooth surface representation of the first geometry;

producing, by the shape modeling computer program, second geometry defined in the data structure based on the indication of the amount of desired prismatification, wherein the second geometry replaces the first geometry in representing the three-dimensional model of the object, wherein the control mesh comprises edges connected by vertices, and the producing comprises, for at least a first set of the edges connected by the vertices, the first set comprising first edges and first vertices:

calculating a distance tolerance for the first edges and the first vertices based on the indication of the amount of desired prismatification;

fitting, for each vertex in the first vertices, a circle to the vertex and its two nearest neighbor vertices in the first set, the circle having a local center point and radius; and adjusting, for at least one subset of the first vertices that have at least their local center points within the distance tolerance of each other, a position of each vertex in the at least one subset to have a common radius distance to a common center point to turn the first geometry into the second geometry; and providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

* * * * *